May 28, 1940.  W. E. P. JEFFERY  2,202,661
VEHICLE BRAKE
Filed June 1, 1938   5 Sheets-Sheet 1
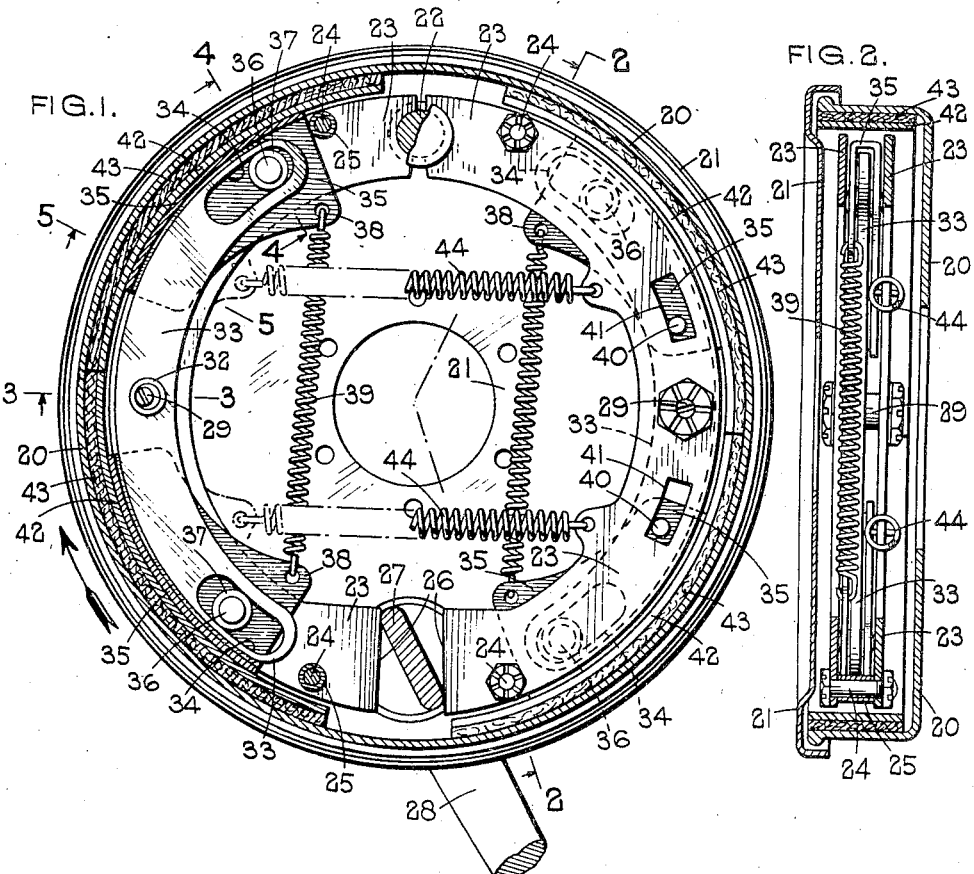
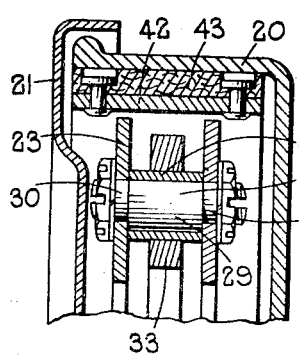
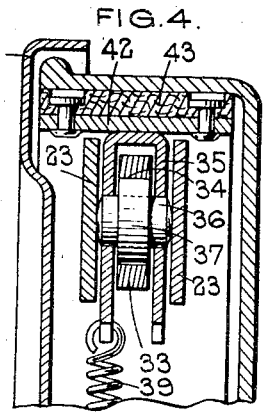
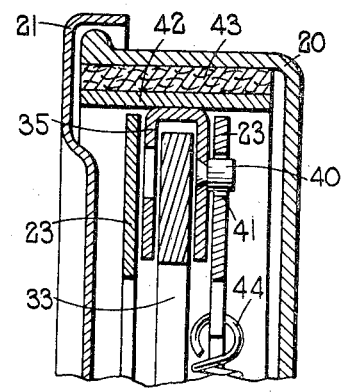
Inventor
WINSTONE E. P. JEFFERY
By
Attorneys

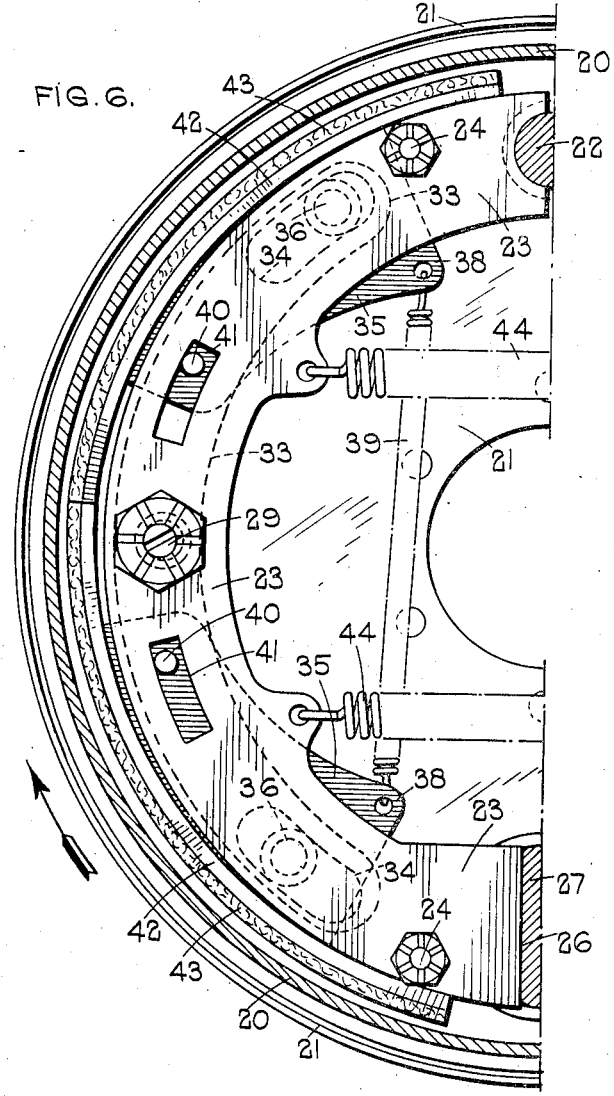

May 28, 1940.  W. E. P. JEFFERY  2,202,661
VEHICLE BRAKE
Filed June 1, 1938     5 Sheets-Sheet 3
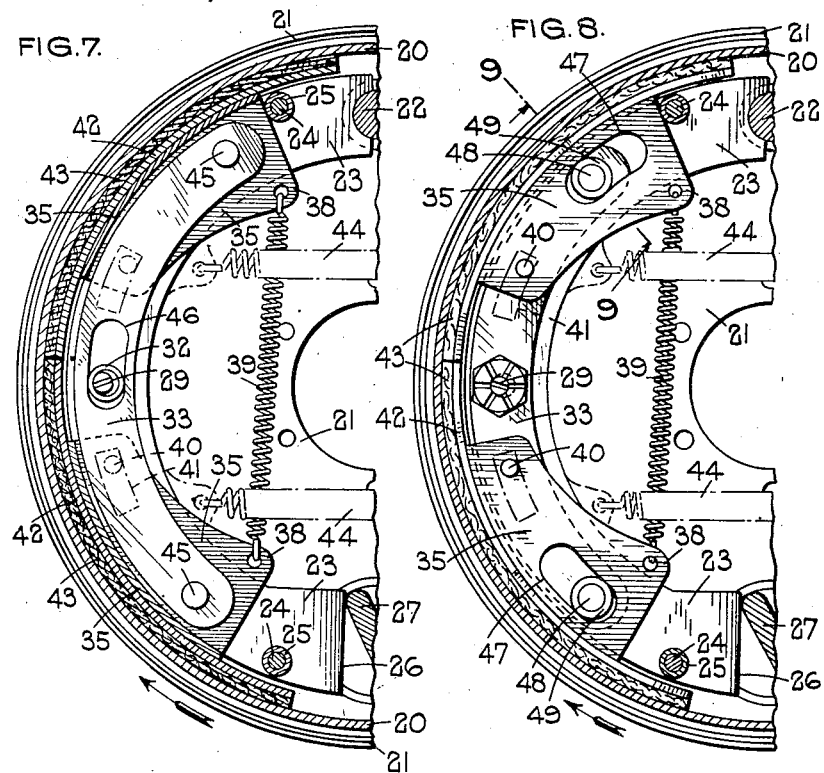
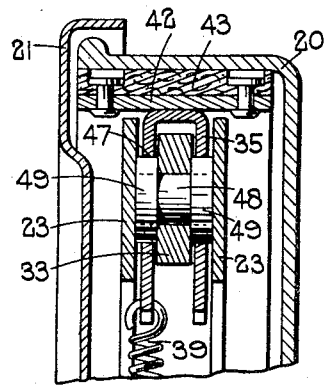
Inventor
WINSTONE E. P. JEFFERY
By
Attorneys May 28, 1940.  W. E. P. JEFFERY  2,202,661
VEHICLE BRAKE
Filed June 1, 1938   5 Sheets-Sheet 4
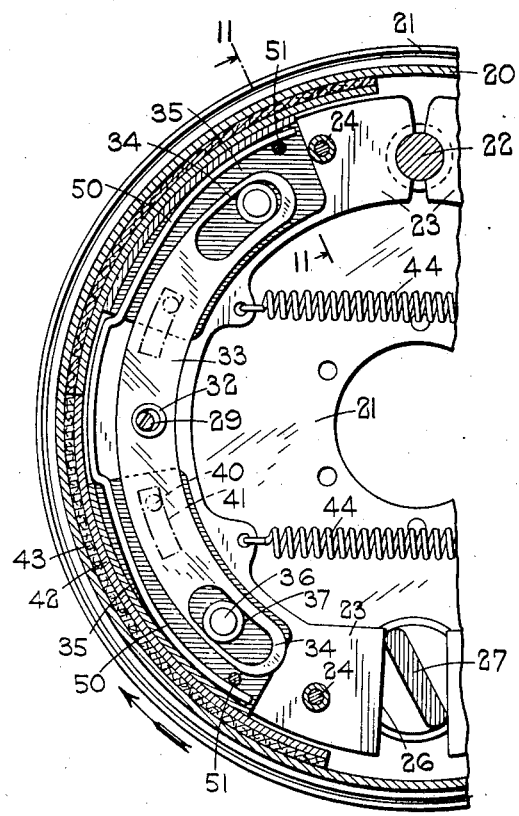
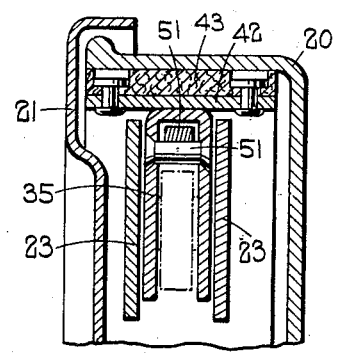
Inventor
WINSTONE E. P. JEFFERY
By
Attorneys

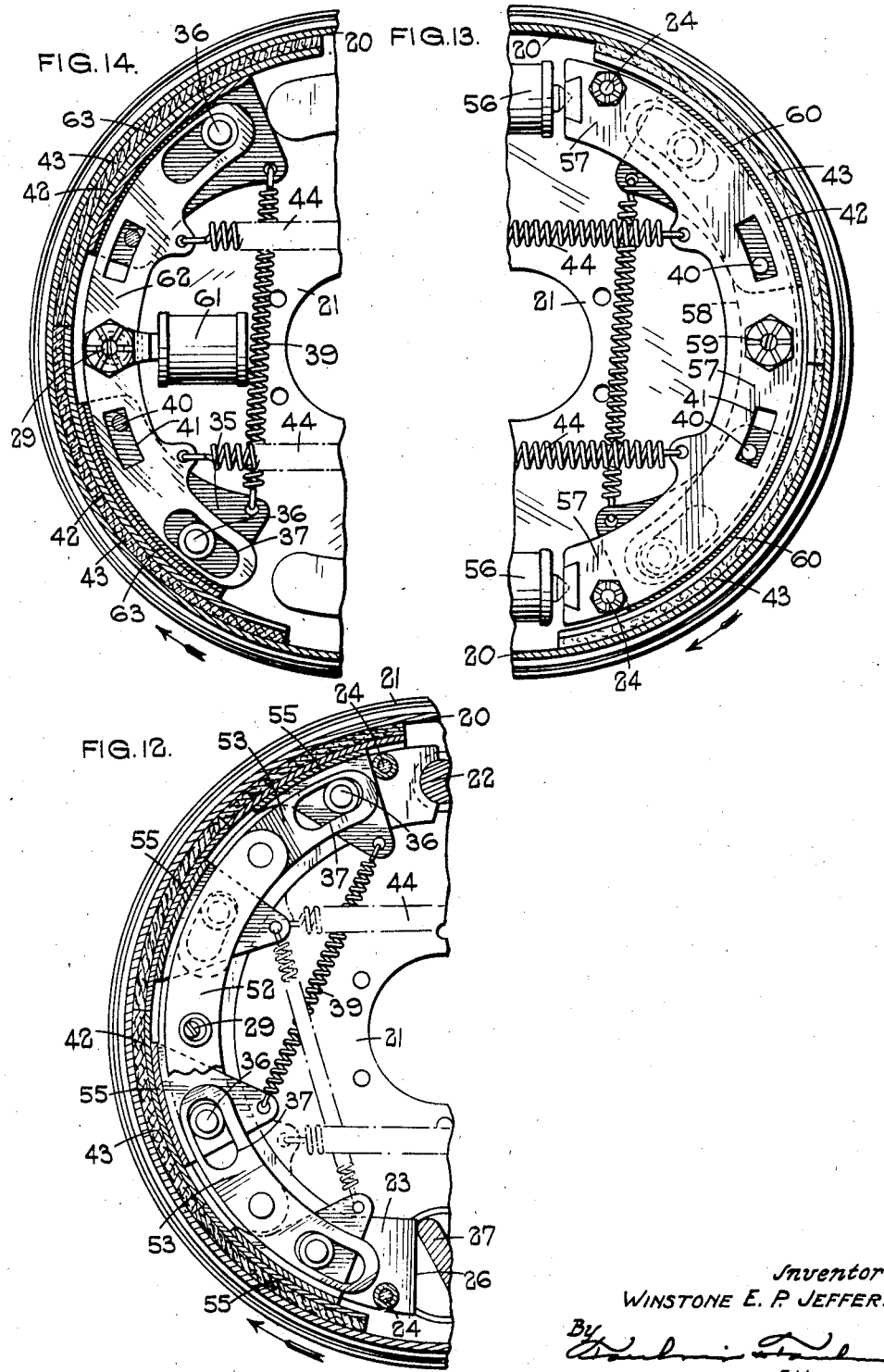

Patented May 28, 1940

2,202,661

UNITED STATES PATENT OFFICE 2,202,661

VEHICLE BRAKE

Winstone Eric Payton Jeffery, Shirley, England

Application June 1, 1938, Serial No. 211,257
In Great Britain June 8, 1937

12 Claims. (Cl. 188—78)

This invention relates to vehicle brakes of the kind including a brake drum, a stationary plate or bracket adjacent the drum, and one or more pair of brake shoes disposed within the drum, brake linings disposed between the shoes and the periphery of the drum, and means for moving each shoe outwardly so as to exert outward pressure upon the linings.

In brakes of this kind as at present made, it is usual to mount the linings upon the brake shoes. In such brakes, however, the brake shoes are usually formed as levers each pivoted at one end to the stationary plate or bracket, a cam or other pressure-applying means operating upon their opposite ends. In this arrangement, owing to the converging relationship between each brake shoe and the adjacent part of the brake drum when the brake is off, the pressure exerted by the brake lining on the brake drum is not uniform over the length of the brake lining. Further, owing to the position of the pivot about which the levers move, such pressure does not act radially in relation to the interior surface of the brake drum periphery.

In brakes of the kind set forth, in practice it is found that only a portion of the periphery of the brake drum can be efficiently engaged by the brake shoes because the greater part of the braking pressure obtainable is concentrated at one end of the shoe, namely the end remote from the shoe pivot.

The object of the present invention is to provide an improved construction.

According to one aspect of the present invention, the brake comprises one or more pairs of brake shoes, the or each pair being pivotally associated with a yoke, in combination with pressure-applying means adapted to operate upon the or each yoke intermediate its ends, whereby the outward pressure upon the shoes will be balanced.

The yokes may be pivoted to brake levers each pivoted at one end and operated on by pressure-producing means at the other. Alternatively, the pressure-producing means may operate directly upon the yokes or through floating or sliding pressure bars.

According to another aspect of this invention, a plurality of brake shoe units are associated with each brake lever, and means are provided to balance the braking movement imparted to the shoes.

According to a further aspect of the invention, a brake of the kind described comprises a two-armed yoke pivotally associated with each brake lever, and a brake shoe pivotally associated with each arm of the yoke.

The pivot between each yoke and its lever may be adjustable so that the yoke can be adjusted towards or away from the brake drum.

Each brake shoe may be pivoted to the yoke upon an axis which is situated between the ends of the shoe, and this axis may be nearer to one end of the shoe than the other.

In an arrangement wherein a yoke carries two brake shoes pivoted to the yoke, the remote ends of the shoes may be connected by tension springs, or other spring means may be provided tending to turn the brake shoes upon their pivots, and this turning movement may be restricted by a suitable stop which may be adjustable.

The brake shoes may be permitted a limited rotary movement about the axis of the brake drum in relation to the brake levers, and this may be effected by connecting the brake shoes to the yoke by pin and slot connections, the slots preferably being circumferential. The slots may be in the yoke or may be in the shoes.

Stops may be provided on the brake levers or on the stationary plate to limit the rotary movement of the shoes in relation to the brake drum.

The possible circumferential or rotary movement of the shoes may be provided by providing a pin and slot connection between the yoke and the brake lever.

The pivotal method of mounting the brake shoes enables them to assume a truly parallel or concentric relationship with the brake drum under any value of pressure, so that the brake linings will wear more uniformly than hitherto.

Referring to the drawings—

Figure 1 is a sectional view in side elevation showing one construction.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 1.

Figure 6 is a view upon an enlarged scale showing the construction shown in Figures 1 to 5 when the brake has been released, i. e. when the shoes are not in engagement with the brake drum.

Figure 7 is a sectional view in side elevation showing another construction in which the yoke is provided with a pin and slot connection to the lever.

Figure 8 is a sectional view in side elevation showing a further construction.

Figure 9 is a section on line 9—9 of Figure 8.

Figure 10 is a view in side elevation showing a modified construction.

Figure 11 is a section on line 11—11 of Figure 10.

Figure 12 is a sectional view in side elevation showing a further modification.

Figure 13 is a sectional view in side elevation showing a further modification.

Figure 14 is a sectional view in side elevation showing a further modification.

In the construction illustrated in Figures 1 to 6, the brake comprises a brake drum 20 of the usual form, and a fixed back plate 21 carrying a pivot 22 upon which the brake levers 23 are mounted.

In this construction conveniently each brake lever comprises two plates 23 arranged side by side as shown in Figures 3, 4 and 5. These plates are connected in spaced relationship by pins 24 carrying distance tubes 25, the distance tubes extending between the plates, and the pins having their ends secured in the plates.

Between the free ends 26 of the brake levers operates a typical cam 27 which can be turned by means of a lever 28. Instead of operating the brake levers by a cam, any other known form of mechanism for operating them can be used.

At about the centre of the length of each brake lever 23, an adjustable pin 29 is provided. The ends 30 of these pins are eccentric in relation to their centre parts 31, and the arrangement is such that these pins can be turned upon their ends 30 so as to adjust the centre part 31 eccentrically.

Mounted upon the centre parts 31 of these pins I provide sleeves 32, and pivoted on these sleeves are yokes 33.

As illustrated each yoke is formed as a single curved plate having two arms, capable of pivoting upon its pin 29.

In the construction shown in Figures 1 to 6, near the ends of the two arms of the yokes circumferential slots 34 are provided.

The brake shoes formed of circumferentially shaped plates 42 which carry the brake shoe linings 43 have at their inner sides channel section members 35 which are to be seen clearly in Figures 4 and 5.

These channels 35 constitute webs which embrace the yokes 33 and are situated between the plates 23 forming the brake levers.

These channels 35 are each provided with a pivot pin 36 engaged with, and extending from web to web, each pin 36 having thereon a collar 37 engaging in one of the slots 34 of the yoke.

Further, it should be observed that the pivots 36 connecting the brake shoes to the yoke arms are situated in each case near one end of the brake shoe so that each brake shoe has a short arm and a longer arm. The shorter arm of each brake shoe is provided with a lug 38, and these lugs are connected by tension springs 39 which tend to rock the brake shoes in opposite directions about the axes of the pivots 36 as they move into the inoperative position, thus increasing the clearance between these ends of the shoes and the drum 20.

It should be understood that the disposition or distance of the pivots relative to the ends of the shoes is not to be confined to the specific relationship described and shown in the drawings, but may be varied as desired.

The rocking motion of the brake shoes is limited by associating the longer arm of each brake shoe with a fixed pin 40 which projects laterally from the channel web 35 and engages in a slot 41 in one of the plates 23 of the brake lever, this slot being wider than the diameter of the pin 40, as shown in Figure 6. The arrangement is such that, when the brake is in the "off" position, the brake shoes can turn to some extent about their pivots 36, but their longer arms are prevented from contacting the drum 20.

The channels 35 forming the brake shoes are secured to circumferential plates 42 which carry the brake shoe linings 43 adapted to engage with the brake. The brake levers 23 are connected by pull-off springs 44, so that when the cam 27 or its equivalent is moved into the released position, the free ends 26 of the brake levers are drawn towards one another.

When the cam 27 or its equivalent is operated in a manner to force the free ends 26 of the brake levers apart, an outward pressure is transmitted to the yokes 33 through the pins 29, and the yokes in turn transmit an outward pressure through the pivot pins 36 to the shoes, which are thus forced into contact with the drum 20.

In the modification shown in Figure 7, instead of connecting the brake shoes to the yoke by a pin and slot connection, they are pivoted at 45 upon the ends of the arms of the yoke, and the circumferential movement permitted to the shoes by the slots 34 in the construction shown in Figures 1 to 6 is in this case permitted to the shoes by slotting the yoke as shown at 46, the pivot pin 29 by which the yoke is connected to the lever passing through the slot 46.

A further modification is shown in Figures 8 and 9, wherein the circumferential motion for the shoes is provided by making slots 47 in the webs of the shoes. In this construction the pivot pins connecting the yoke to the shoes are shown at 48, and are fixed in the yoke and are provided with collars 49 at their ends which engage in the slots 47.

A further modification is shown in Figures 10 and 11, wherein the tension springs 39 are replaced by curved wire springs 50 acting upon pins 51 extending between the webs of the shoes, the springs tending to turn the shorter arms of the shoes inwardly.

In Figure 12 a modified form of construction is shown in which each brake lever 23 has pivoted to it a yoke 52, and instead of mounting the brake shoes on the ends of the yoke, further yokes 53 are pivoted intermediate their ends to the ends of the yoke 52. The brake shoes 55 are pivoted to the yokes 53, there being two pairs of brake shoes for each of the brake levers. Any of the arrangements described for permitting the brake shoes a limited amount of circumferential movement may be used with this construction.

A further modified form of the apparatus is shown in Figure 13, wherein pressure-producing appliances such as the hydraulic cylinders 56 are provided, these cylinders containing plungers which operate upon pressure bars 57. It will be understood that the cylinders 56 may be mounted on the stationary back plate. A yoke 58 is pivoted at 59 to each of the pressure bars 57, and the shoes 60 are pivoted to the ends of the yokes.

Another modification is illustrated in Figure 14, wherein a single pressure-producing appliance such as the hydraulic cylinder 61 is provided on the back plate, and the plungers in this cylinder are pivotally connected to the yoke 62 which carries the brake shoes 63. The features of construction which allow a limited peripheral movement of the brake shoes already described may also be applied to this construction.

It will be understood that the operation of the modified structures aforesaid is essentially the same as that already described with reference to the construction shown in Figures 1 to 6.

The present invention provides a brake wherein a greater portion of the periphery of the brake drum is utilised than hitherto. Further, the invention provides a means whereby the braking pressure of the shoes is substantially uniform throughout the length of the shoes.

The methods of mounting the brake shoes herein described enable each individual shoe to assume when the brake is applied a truly parallel or concentric relationship with the brake drum which is maintained under any value of pressure, so that the brake linings carried by the shoes may wear evenly.

What I claim then is:

1. A vehicle brake comprising a rotary drum, a fixed support, pressure-producing means carried by said fixed support, a yoke pivotally engaged intermediate its ends by said pressure-producing means, the action of said pressure-producing means being to move said yoke bodily towards the periphery of said drum, and a plurality of arcuate shoes each pivotally connected intermediate its ends to said yoke, the pivot connecting each shoe to said yoke being nearer to one end of said shoe than to the other.

2. A vehicle brake comprising a rotary drum, a fixed support, pressure-producing means carried by said fixed support, a yoke pivotally engaged intermediate its ends by said pressure-producing means, the action of said pressure-producing means being to move said yoke bodily towards the periphery of said drum, a plurality of arcuate shoes each pivotally connected intermediate its ends to said yoke, biassing means tending to turn said brake shoes about their pivots and stops adapted to limit the pivotal motion of said shoes under the action of said biassing means when the brake is released.

3. A vehicle brake comprising a rotary drum, a fixed support, pressure-producing means carried by said fixed support, a yoke pivotally engaged intermediate its ends by said pressure-producing means, the action of said pressure-producing means being to move said yoke bodily towards the periphery of said drum, and a plurality of arcuate shoes each pivotally connected intermediate its ends to said yoke, said shoes being permitted a limited rotary movement about the axis of said drum in relation to said pressure-producing means.

4. A vehicle brake comprising a rotary drum, a fixed support, pressure-producing means carried by said fixed support, a yoke pivotally engaged intermediate its ends by said pressure-producing means, the action of said pressure-producing means being to move said yoke bodily towards the periphery of said drum, and a plurality of arcuate shoes each pivotally connected intermediate its ends to said yoke, said yoke being slotted circumferentially and the shoe pivots engaging in the slots.

5. A vehicle brake comprising a rotary drum, a fixed support, pressure-producing means carried by said fixed support, a brake lever receiving pressure from said pressure-producing means, a yoke pivoted intermediate its ends to said brake lever, and a plurality of brake shoes pivotally associated with the said yoke, the axis of the pivot by which each brake shoe is connected to said yoke being situated intermediate the ends of said shoe.

6. A vehicle brake comprising a rotary drum, a fixed support, pressure-producing means carried by said fixed support, a brake lever receiving pressure from said pressure-producing means, a yoke pivoted intermediate its ends to said brake lever, and a plurality of brake shoes pivotally associated with the said yoke, the pivot connecting each shoe to said yoke being nearer to one end of said shoe than to the other.

7. A vehicle brake comprising a rotary drum, a fixed support, pressure producing means carried by said fixed support, a brake lever receiving pressure from said pressure-producing means, a yoke pivoted intermediate its ends to said brake lever, a plurality of brake shoes pivotally associated with said yoke, biasing means tending to turn said brake shoes about their pivots, and stops adapted to limit the pivotal motion of said shoes under the action of said biassing means when the brake is released.

8. A vehicle brake comprising a rotary drum, a fixed support, pressure producing means carried by said fixed support, a brake lever receiving pressure from said pressure producing means, a yoke pivoted intermediate its ends to said brake lever, and a plurality of brake shoes pivotally associated with the said yoke, said shoes being permitted a limited rotary movement about the axis of said drum in relation to said brake lever.

9. A vehicle brake comprising a rotary drum, a fixed support, pressure producing means carried by said fixed support, a brake lever receiving pressure from said pressure producing means, a yoke pivoted intermediate its ends to said brake lever, a plurality of brake shoes pivotally associated with said yoke, and biasing means whereby in their inoperative position said brake shoes are caused to assume arcuate convergence one with another.

10. A vehicle brake comprising a rotary drum, a fixed support, pressure producing means carried by said fixed support, a brake lever comprising two plates arranged side by side, members connecting said plates together in spaced relationship, said brake lever receiving pressure from said pressure producing means, a yoke pivoted intermediate its ends to said brake lever, and a plurality of brake shoes pivotally asssociated with said yoke, the members connecting said spaced plates also serving as stops to limit the rotary motion of said shoes about their pivots.

11. A vehicle brake comprising a rotary drum, a fixed support, pressure producing means carried by said fixed support, a brake lever receiving pressure from said pressure producing means, a yoke pivoted intermediate its ends to said brake lever, and a plurality of brake shoes pivotally associated with the said yoke, said yoke being slotted circumferentially and the shoe pivots engaging in the slots.

12. A vehicle brake comprising a rotary drum, a fixed support, pressure producing means carried by said fixed support, a brake lever receiving pressure from said pressure producing means, a yoke pivoted intermediate its ends to said brake lever, and a plurality of brake shoes pivotally associated with the said yoke, said yoke being slotted circumferentially and the slot therein being engaged by the pivot connecting said yoke to said brake lever.

WINSTONE ERIC PAYTON JEFFERY.